United States Patent
Sevilla et al.

(10) Patent No.: US 9,935,791 B2
(45) Date of Patent: Apr. 3, 2018

(54) METHOD AND SYSTEM FOR NAME RESOLUTION ACROSS HETEROGENEOUS ARCHITECTURES

(71) Applicant: CISCO TECHNOLOGY, INC., San Jose, CA (US)

(72) Inventors: Spencer Sevilla, Saratoga, CA (US); Priya Mahadevan, Sunnyvale, CA (US); Jose J. Garcia-Luna-Aceves, San Mateo, CA (US)

(73) Assignee: Cisco Technology, Inc., San Jose, CA (US)

(*) Notice: Subject to any disclaimer, the term of this patent is extended or adjusted under 35 U.S.C. 154(b) by 177 days.

(21) Appl. No.: 13/898,339

(22) Filed: May 20, 2013

(65) Prior Publication Data

US 2014/0344474 A1    Nov. 20, 2014

(51) Int. Cl.
| | | |
|---|---|---|
| *G06F 15/16* | (2006.01) | |
| *H04L 12/54* | (2013.01) | |
| *H04L 29/08* | (2006.01) | |
| *H04L 29/12* | (2006.01) | |
| *H04W 4/00* | (2018.01) | |
| *H04W 4/08* | (2009.01) | |

(52) U.S. Cl.
CPC .......... *H04L 12/54* (2013.01); *H04L 61/1511* (2013.01); *H04L 67/16* (2013.01); *H04W 4/008* (2013.01); *H04W 4/08* (2013.01)

(58) Field of Classification Search
CPC ............. H04L 61/1511; H04L 65/1065; H04L 67/1089; H04L 45/42; H04L 45/44; H04L 45/64; H04L 45/306; H04L 45/7453; H04L 29/06; H04L 29/08072; H04L 29/12009; H04L 29/12066

USPC .............. 709/217, 219, 227, 238, 242, 245; 707/533; 370/241
See application file for complete search history.

(56) References Cited

U.S. PATENT DOCUMENTS

| | | | |
|---|---|---|---|
| 817,441 | A | 4/1906 | Niesz |
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Yusuke DOI, DNS meets DHT: Treating Massive ID Resolution Using DNS Over DHT, Jan. 31-Feb. 4, 2005.*

(Continued)

*Primary Examiner* — Joseph E Avellino
*Assistant Examiner* — Patrick Ngankam

(57) ABSTRACT

One embodiment of the present invention provides a system for resolving a name request in a network comprising a plurality of groups that use different name-resolution schemes. During operation, the system receives, at a first group, the name request; identifies a parent group of the first group, which is a member of the parent group; and in response to failing to resolve the name request within the first group, forwards the name request to the identified parent group.

15 Claims, 8 Drawing Sheets

(56) References Cited

U.S. PATENT DOCUMENTS

| | | | |
|---|---|---|---|
| 5,506,844 A | 4/1996 | Rao | |
| 5,629,370 A | 5/1997 | Freidzon | |
| 5,870,605 A | 2/1999 | Bracho | |
| 6,052,683 A | 4/2000 | Irwin | |
| 6,091,724 A | 7/2000 | Chandra | |
| 6,173,364 B1 | 1/2001 | Zenchelsky | |
| 6,226,618 B1 | 5/2001 | Downs | |
| 6,233,646 B1 | 5/2001 | Hahm | |
| 6,332,158 B1 * | 12/2001 | Risley | G06F 17/30887 707/E17.115 |
| 6,366,988 B1 | 4/2002 | Skiba | |
| 6,574,377 B1 | 6/2003 | Cahill | |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,769,066 B1 | 7/2004 | Botros | |
| 6,772,333 B1 | 8/2004 | Brendel | |
| 6,862,280 B1 | 3/2005 | Bertagna | |
| 6,901,452 B1 | 5/2005 | Bertagna | |
| 6,917,985 B2 | 7/2005 | Madruga | |
| 6,968,393 B1 | 11/2005 | Chen | |
| 6,981,029 B1 | 12/2005 | Menditto | |
| 7,013,389 B1 | 3/2006 | Srivastava | |
| 7,031,308 B2 | 4/2006 | Garcia-Luna-Aceves | |
| 7,061,877 B1 | 6/2006 | Gummalla | |
| 7,206,860 B2 | 4/2007 | Murakami | |
| 7,257,837 B2 | 8/2007 | Xu | |
| 7,287,275 B2 | 10/2007 | Moskowitz | |
| 7,315,541 B1 | 1/2008 | Housel | |
| 7,339,929 B2 | 3/2008 | Zelig | |
| 7,350,229 B1 | 3/2008 | Lander | |
| 7,382,787 B1 | 6/2008 | Barnes | |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,543,064 B2 | 6/2009 | Juncker | |
| 7,552,233 B2 | 6/2009 | Raju | |
| 7,555,482 B2 | 6/2009 | Korkus | |
| 7,555,563 B2 | 6/2009 | Ott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,647,507 B1 | 1/2010 | Feng | |
| 7,660,324 B2 | 2/2010 | Oguchi | |
| 7,685,290 B2 | 3/2010 | Satapati | |
| 7,698,463 B2 | 4/2010 | Ogier | |
| 7,769,887 B1 | 8/2010 | Bhattacharyya | |
| 7,779,467 B2 | 8/2010 | Choi | |
| 7,801,177 B2 | 9/2010 | Luss | |
| 7,816,441 B2 | 10/2010 | Elizalde | |
| 7,831,733 B2 | 11/2010 | Sultan | |
| 7,908,337 B2 * | 3/2011 | Garcia-Luna-Aceves et al. | 709/217 |
| 7,924,837 B1 | 4/2011 | Shabtay | |
| 7,953,885 B1 | 5/2011 | Devireddy | |
| 8,000,267 B2 | 8/2011 | Solis | |
| 8,010,691 B2 | 8/2011 | Kollmansberger | |
| 8,074,289 B1 | 12/2011 | Carpentier | |
| 8,117,441 B2 | 2/2012 | Kurien | |
| 8,160,069 B2 | 4/2012 | Jacobson | |
| 8,204,060 B2 | 6/2012 | Jacobson | |
| 8,214,364 B2 | 7/2012 | Bigus | |
| 8,224,985 B2 | 7/2012 | Takeda | |
| 8,225,057 B1 | 7/2012 | Zheng | |
| 8,271,578 B2 | 9/2012 | Sheffi | |
| 8,312,064 B1 | 11/2012 | Gauvin | |
| 8,386,622 B2 | 2/2013 | Jacobson | |
| 8,467,297 B2 | 6/2013 | Liu | |
| 8,553,562 B2 | 10/2013 | Allan | |
| 8,572,214 B2 | 10/2013 | Garcia-Luna-Aceves | |
| 8,654,649 B2 | 2/2014 | Vasseur | |
| 8,665,757 B2 | 3/2014 | Kling | |
| 8,667,172 B2 | 3/2014 | Ravindran | |
| 8,688,619 B1 | 4/2014 | Ezick | |
| 8,699,350 B1 | 4/2014 | Kumar | |
| 8,750,820 B2 | 6/2014 | Allan | |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,767,627 B2 | 7/2014 | Ezure | |
| 8,817,594 B2 | 8/2014 | Gero | |
| 8,826,381 B2 | 9/2014 | Kim | |
| 8,832,302 B1 | 9/2014 | Bradford | |
| 8,836,536 B2 | 9/2014 | Marwah | |
| 8,862,774 B2 | 10/2014 | Vasseur | |
| 8,903,756 B2 | 12/2014 | Zhao | |
| 8,937,865 B1 | 1/2015 | Kumar | |
| 9,071,498 B2 | 6/2015 | Beser | |
| 9,112,895 B1 | 8/2015 | Lin | |
| 2002/0010795 A1 | 1/2002 | Brown | |
| 2002/0048269 A1 | 4/2002 | Hong | |
| 2002/0054593 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0176404 A1 | 11/2002 | Girard | |
| 2002/0188605 A1 | 12/2002 | Adya | |
| 2002/0199014 A1 | 12/2002 | Yang | |
| 2003/0046437 A1 | 3/2003 | Eytchison | |
| 2003/0048793 A1 | 3/2003 | Pochon | |
| 2003/0051100 A1 | 3/2003 | Patel | |
| 2003/0074472 A1 | 4/2003 | Lucco | |
| 2003/0097447 A1 | 5/2003 | Johnston | |
| 2003/0140257 A1 | 7/2003 | Peterka | |
| 2004/0024879 A1 | 2/2004 | Dingman | |
| 2004/0030602 A1 | 2/2004 | Rosenquist | |
| 2004/0073715 A1 | 4/2004 | Folkes | |
| 2004/0139230 A1 | 7/2004 | Kim | |
| 2004/0221047 A1 | 11/2004 | Grover | |
| 2004/0225627 A1 | 11/2004 | Botros | |
| 2004/0252683 A1 | 12/2004 | Kennedy | |
| 2005/0003832 A1 | 1/2005 | Osafune | |
| 2005/0028156 A1 | 2/2005 | Hammond | |
| 2005/0043060 A1 | 2/2005 | Brandenberg | |
| 2005/0050211 A1 | 3/2005 | Kaul | |
| 2005/0074001 A1 | 4/2005 | Mattes | |
| 2005/0149508 A1 | 7/2005 | Deshpande | |
| 2005/0159823 A1 | 7/2005 | Hayes | |
| 2005/0198351 A1 | 9/2005 | Nog | |
| 2005/0249196 A1 | 11/2005 | Ansari | |
| 2005/0259637 A1 | 11/2005 | Chu | |
| 2005/0262217 A1 | 11/2005 | Nonaka | |
| 2005/0289222 A1 | 12/2005 | Sahim | |
| 2006/0010249 A1 | 1/2006 | Sabesan | |
| 2006/0029102 A1 | 2/2006 | Abe | |
| 2006/0039379 A1 | 2/2006 | Abe | |
| 2006/0051055 A1 | 3/2006 | Ohkawa | |
| 2006/0072523 A1 | 4/2006 | Richardson | |
| 2006/0099973 A1 | 5/2006 | Nair | |
| 2006/0129514 A1 | 6/2006 | Watanabe | |
| 2006/0133343 A1 | 6/2006 | Huang | |
| 2006/0173831 A1 | 8/2006 | Basso | |
| 2006/0193295 A1 | 8/2006 | White | |
| 2006/0206445 A1 | 9/2006 | Andreoli | |
| 2006/0215684 A1 | 9/2006 | Capone | |
| 2006/0223504 A1 | 10/2006 | Ishak | |
| 2006/0256767 A1 | 11/2006 | Suzuki | |
| 2006/0268792 A1 | 11/2006 | Belcea | |
| 2007/0019619 A1 | 1/2007 | Foster | |
| 2007/0073888 A1 | 3/2007 | Madhok | |
| 2007/0094265 A1 | 4/2007 | Korkus | |
| 2007/0112880 A1 | 5/2007 | Yang | |
| 2007/0124412 A1 | 5/2007 | Narayanaswami | |
| 2007/0127457 A1 | 6/2007 | Mirtorabi | |
| 2007/0160062 A1 | 7/2007 | Morishita | |
| 2007/0162394 A1 | 7/2007 | Zager | |
| 2007/0189284 A1 | 8/2007 | Kecskemeti | |
| 2007/0195765 A1 | 8/2007 | Heissenbuttel | |

(56) References Cited

U.S. PATENT DOCUMENTS

| | | |
|---|---|---|
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1* | 11/2011 | Wang et al. .................. 709/238 |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1* | 2/2013 | Shi ................ H04L 65/4084 709/217 |
| 2013/0051392 A1 | 2/2013 | Filsfils |

(56) References Cited

U.S. PATENT DOCUMENTS

| | | |
|---|---|---|
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1* | 5/2014 | Vilenski et al. ............. 709/213 |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0269703 A1* | 9/2014 | Sundaresan ............. H04L 45/04 370/390 |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Doi "DNS meet DHT: Treating Massive ID Resolution using DNS Over DHT", Proceedings of the 2005 Symposium on Applications and the Internet (SAINT'05).*

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

"PBC Library-Pairing-Based Cryptography-About," http://crypto.stanford.edu/pbc. downloaded Apr. 27, 2015.

C. Gentry and A. Silverberg. Hierarchical ID-Based Cryptography. Advances in Cryptology—ASIACRYPT 2002. Springer Berlin Heidelberg (2002).

Boneh et al., "Collusion Resistant Broadcast Encryption With Short Ciphertexts and Private Keys", 2005.

D. Boneh and M. Franklin. Identity-Based Encryption from the Weil Pairing. Advances in Cryptology—CRYPTO 2001, vol. 2139, Springer Berlin Heidelberg (2001).

Anteniese et al., "Improved Proxy Re-Encryption Schemes with Applications to Secure Distributed Storage", 2006.

Xiong et al., "CloudSeal: End-to-End Content Protection in Cloud-based Storage and Delivery Services", 2012.

J. Bethencourt, A, Sahai , and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digit.

J. Shao and Z. Cao. CCA-Secure Proxy Re-Encryption without Pairings. Public Key Cryptography. Springer Lecture Notes in Computer ScienceVolume 5443 (2009).

Gopal et al. "Integrating content-based Mechanisms with hierarchical File systems", Feb 1999, University of Arizona, 15 pages.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

RTMP (2009). Available online at http://wwwimages.adobe.com/www.adobe.com/content/dam/Adobe/en/devnet/rtmp/ pdf/rtmp specification 1.0.pdf.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Kamara and K. Lauter. Cryptographic Cloud Storage. Financial Cryptography and Data Security. Springer Berlin Heidelberg (2010).

Sandvine, Global Internet Phenomena Report—Spring 2012. Located online at http://www.sandvine.com/downloads/ documents/Phenomenal H 2012/Sandvine Global Internet Phenomena Report 1H 2012.pdf.

The Despotify Project (2012). Available online at http://despotify.sourceforge.net/.

(56) References Cited

OTHER PUBLICATIONS

V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.

(56) References Cited

OTHER PUBLICATIONS

Heinemeier, Kristin, et al. "Uncertainties in Achieving Energy Savings from HVAC Maintenance Measures in the Field." ASHRAE Transactions 118.Part 2 {2012}.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.

(56) References Cited

OTHER PUBLICATIONS

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

Sun, Ying, and Daniel S. Weld. "A framework for model-based repair." AAAI. 1993.

T. Ballardie, P. Francis, and J. Crowcroft, "Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N. H. Briggs, and R.L. Braynard, 'Networking named content,' in Proc. ACM CoNEXT 2009, Rome, Italy, Dec. 2009, pp. 1-12.

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al. "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network and Computer Applications 35 (2012) 221-229.

D. Trossen and G. Parisis, "Designing and realizing and information-centric internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Amadeo et al. "Design and Analysis of a Transport-Level Solution for Content-Centric VANETs", University "Mediterranea" of Reggio Calabria, Jun. 15, 2013.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

* cited by examiner

FERN NAME-RESOLUTION GROUP API

| Function Prototype | Comments |
|---|---|
| int (0 = success) joinGroup(args) | args varies as a group-specific parameter |
| int (0 = success) leaveGroup() | Groups must also support ungraceful departures |
| int (0 = success) registerName(name) | name is not fully-qualified (i.e. just "printer") |
| network address resolveName(name) | name is not fully-qualified (i.e. just "printer") |
| network address getParent() | assumes the parent group can be reached at this address:udp53 |
| network address getChild(name) | same as above, but returns (null) if it has no child with this name |
| int (0 = success) registerChild(name) | name is not fully-qualified (i.e. just "abc") |
| int (0 = success) deregisterChild(name) | name is not fully-qualified (i.e. just "abc") |

FIG. 3A

FERN NRG RULES

1. NRG *X* has at most one parent NRG *Y* in the FERN NRT, and $fullname_X = shortname_X;fullname_Y$.

2. NRG *X* can have several child NRGs in the FERN NRT, and each of these children has the full name *childname: fullname_X*.

3. NRG *X* must be able to communicate with its parent and children NRGs in the FERN NRT.

4. NRG *X* must know the addresses of all its ancestor NRGs in the FERN NRT.

5. NRG *X* is responsible for directly answering all queries that end in *fullname_X*.

6. NRG *X* must forward queries to the best match of NRG possible, adhering to the caching rules.

7. NRG *X* must return an error for a query that it cannot answer or forward.

FIG. 3B

FERN CACHING RULES

1. A node in NRG X may cache the address of nodes of NRGs for which NRG X has a branch in the FERN NRT.

2. A node in NRG X may not cache addresses of nodes in NRGs that are closer to the root of the FERN NRT.

3. A node in NRG X may cache the addresses of nodes in NRGs that are at the same level of NRG X in the NRT, or further down the NRT.

600

METHOD AND SYSTEM FOR NAME RESOLUTION ACROSS HETEROGENEOUS ARCHITECTURES

This invention was made with U.S. government support under NAS2-03144.TO.030.10.MD.D awarded by National Aeronautics and Space Administration (NASA) Ames Research Center. The U.S. government has certain rights in the invention.

BACKGROUND

Field

This disclosure is generally related to name resolutions in networks. More specifically, this disclosure is related to a method and a system that can provide a unifying framework for name resolution across heterogeneous name-resolution systems.

Related Art

Service discovery and name resolution are vital operations in any network. Users and applications often use text-based strings, such as uniform resource locators (URLs), rather than network addresses to indicate the content or services they require, and these names must then be mapped to network addresses before communication is possible. Such a name-resolution requirement applies to today's and future networks and the Internet at large.

Unfortunately, current approaches to name resolution are unable to support future networking environments that include different types of network, each using a different name-resolution protocol. This is because no single name-resolution protocol has been devised that works well across all types of network, and the different currently available name-resolution protocols have not been designed to interoperate with one another. For example, consider the case in which a user accidentally leaves her laptop at home and wishes to access it from her office. The laptop most likely uses multicast domain name system (mDNS) to name itself on the home network, but the user has no way of resolving this name outside of that home network environment and, thus, cannot discover the laptop. As another example, nodes in a mobile ad hoc network (MANET) may use a distributed protocol to resolve each other's names, but there is no protocol for them to extend this name resolution to the Internet through the domain name system (DNS), despite the presence of a network-layer gateway bridging the MANET to the Internet.

Currently available systems for name resolution and service discovery can be loosely categorized into client-server systems, peer-to-peer systems, or systems based on overlay networks. Additionally, there are hybrid systems employing more than one of these architectures.

The most widely used system for name resolution today is the domain name system (DNS). DNS relies on a hierarchy of servers that must be configured to forward a name request to the appropriate server, which then resolves that name request to an IP address. Through the use of this hierarchy, load-balancing "secondary" servers, and caching, DNS provides name resolution for the entire Internet today. However, this scalability comes with a price. First, DNS relies completely on these servers: if the authoritative DNS server for a subdomain "example.com" is down, overloaded, or configured incorrectly, then all DNS lookups for "*.example.com" will fail and "www.example.com" is not reachable, regardless of the state of the web server itself. Second, the DNS relies on hosts to configure their IP addresses with their DNS servers using out-of-bound communications, which results in a static system that cannot support dynamic networks. Dynamic DNS seeks to alleviate these limitations by specifying an UPDATE record type; however, it still requires that (1) the host knows the IP address of its authoritative DNS server a priori, and (2) the host successfully sends an update to the authoritative server every single time its IP address changes.

Examples of peer-to-peer systems include mDNS, Simple Service Discovery Protocol (SSDP), and Service Location Protocol (SLP). These peer-to-peer systems do not require a central server to operate, and as a result, minimal configuration is required. These zero configuration (zeroconf) systems are well suited for dynamic environments where hosts come up, go down, and change IP addresses frequently, such as home networks configured with Dynamic Host Configuration Protocol (DHCP) or AutoIP. Unfortunately, all peer-to-peer systems currently share a heavy reliance on IP multicast to propagate both name requests and service announcements through the entire network. As a result, they suffer from relatively high latency and cannot scale, which restricts these protocols to local area networks (LANs) where internal names are denoted by the top-level domain (TLD), ".local."

It is also possible to deploy DNS over an overlay network that uses a distributed hash table (DHT) to reduce the load on individual servers and thus provide higher scalability and better fault tolerance. DHTs serve to decouple the physical location of an entry from its logical location. This architecture helps with load-balancing, removes hot spots and bottlenecks in the hierarchy, and creates a system that is orders of magnitude harder to attack. These benefits are typically achieved by enforcing a flat namespace, where all records in the system are stored as equal objects in one giant DHT. Unfortunately, these approaches rely on a network environment in which the nodes of the overlay are static and available with high uptime, the topology is connected, and links have plenty of bandwidth. The performance of DHTs degrades significantly in dynamic networks as a result of excessive overhead resulting from topology-independent overlay addresses, link failures, and node mobility.

SLP introduces the concept of an optional "Directory Agent" (DA). In the SLP system, all nodes in a network must contact the DA first if it is present. In the case of MANETs, a virtual backbone of "Service Broker Nodes" (SBNs) forms a dominating set in a MANET and proactively maintains routes through the MANET to each other. These approaches attempt to increase scalability by only allowing a select subset of nodes to query the entire network, and requiring that other nodes communicate with their closest directory node. However, they all share the same drawback. More specifically, in these systems communication between directory nodes is unstructured and accomplished by flooding a name request to all other directory nodes, which scales as poorly as the peer-to-peer systems. Multi-level distributed hash table (MDHT) addresses this issue by proposing a hierarchy of DHTs, but cannot scale to large numbers of records because it requires the top-level DHT to contain every record in the system.

Currently available name-resolution protocols lack interoperability, meaning that the different protocols (such as mDNS and DNS) cannot talk to each other, even though mDNS might be best for home networks and DNS might be best for the Internet. One way to support multiple protocols is to designate some top-level domains or TLDs (such as ".local") for certain protocols and to have the node generating a request use the TLD to decide which protocol should be used. Other approaches have been limited to developing higher-layer application programming interfaces (APIs) that mask implementation differences between protocols that already share the same basic architecture, such as SSDP and SLP. Another approach for interoperability across different network architectures, both for routing and name resolution is to divide networks into contexts and use interstitial functions to translate between contexts, instead of requiring all networks to use the same protocol. However, the latter approach may still face problems of scalability and coherency if the number of separate contexts becomes too high or if entire contexts exhibit a high degree of mobility.

SUMMARY

One embodiment of the present invention provides a system for resolving a name request in a network comprising a plurality of groups that use different name-resolution schemes. During operation, the system receives, at a first group, the name request; identifies a parent group of the first group, which is a member of the parent group; and in response to failing to resolve the name request within the first group, forwards the name request to the identified parent group.

In a variation on this embodiment, in response to the parent group not responding to the name request, the system forwards the name request to a grandparent group of the first group.

In a variation on this embodiment, the system receives a response to the name request, which indicates a network address of the requested name and a network address of an intermediate node; caches the network address of the requested name; determines, based on a hierarchy of the groups, whether a hierarchy level of the intermediate node is equal to or below the first group; and in response to the hierarchy level of the intermediate node being equal to or below the first group, caches the network address of the intermediate node.

In a variation on this embodiment, the system determines that a cached entry associated with the name request exists, and forwards the name request or generates a response based on the cached entry.

In a variation on this embodiment, the plurality of groups include one or more of: a Domain Name System (DNS) based group, a multicast DNS (mDNS) based group, and a group that uses a distributed hash table (DHT) based name-resolution scheme.

In a variation on this embodiment, the system responds with an error message to the name request in response to failing to forward the name request.

BRIEF DESCRIPTION OF THE FIGURES

FIG. 3A presents a table showing the pseudocode API for the FERN name-resolution group, in accordance with an embodiment of the present invention.

FIG. 3B presents a table listing a set of rules that govern the behavior of NRGs in a FERN system, in accordance with an embodiment of the present invention.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method and a system that provides a unified name-resolution framework designed to enable efficient name resolution across heterogeneous name-resolution systems operating in dynamic or static networks. Under the unified name-resolution framework, network nodes are organized into name-resolution groups (NRGs), with each group being allowed to perform name resolution independently in different ways. The system arranges these NRGs into a hierarchy and allows them to communicate efficiently, discover each other's presence, and resolve each other's names.

Unified Framework for Name Resolution

Embodiments of the present invention provide a framework for interoperability among different name-resolutions protocols, such as DNS, mDNS, SSDP, SLP, etc. Under this unified name-resolution framework, also referred to as a Federated Extensible Resolution of Names (FERN) system, nodes that use common name-resolution schemes are grouped together as a name-resolution group (NRG). The framework also defines a protocol for intercommunication between different NRGs, and organizes the NRGs into a hierarchy.

Organizing nodes into NRGs provides several advantages, including: (a) separating nodes that use different name-resolution schemes; and (b) reflecting the natural groupings that appear in the underlying network (i.e., subnets), logical hierarchy (i.e., org charts), and users themselves (i.e., social groups). Each NRG supports a set of operations, which may be implemented in various ways. In addition, although the nodes within an NRG may run different network-level protocols, all nodes in the NRG are able to exchange messages at the application layer.

Organizing the NRGs into a naming hierarchy ensures that the system resolves names deterministically, the name requests do not traverse NRGs unnecessarily, and scalability is preserved by enforcing an upper bound on the number of other NRGs any one group must know.

Figure 1:
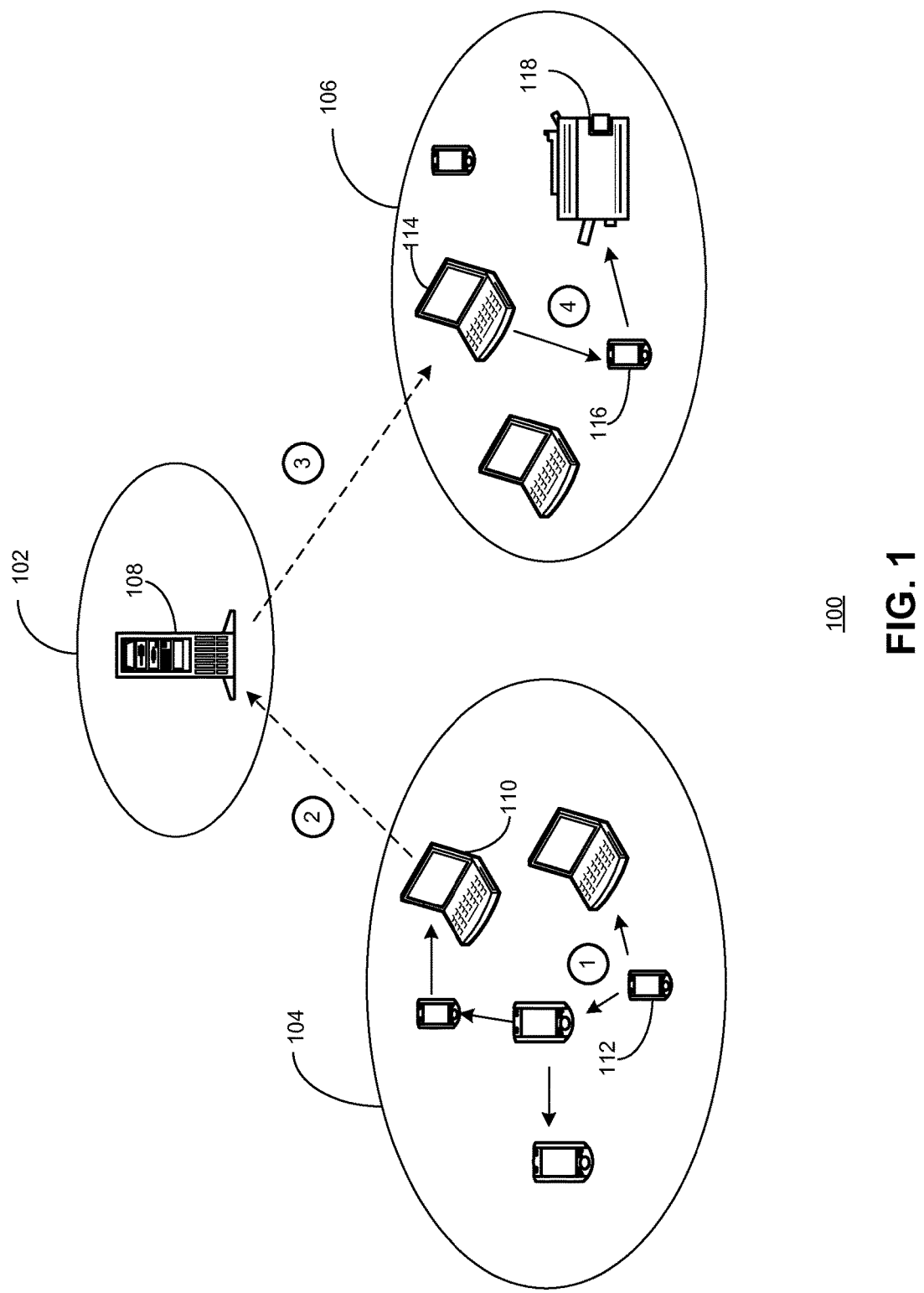
FIG. 1 presents a diagram illustrating an exemplary name resolution group (NRG) hierarchy, in accordance with an embodiment of the present invention.

FIG. 1 presents a diagram illustrating an exemplary name resolution group (NRG) hierarchy, in accordance with an embodiment of the present invention. In the example shown in FIG. 1, a unified name-resolution system (also referred to as a FERN system in this disclosure) 100 includes a number of NRGs, such as NRGs 102, 104, and 106. Each NRG includes a number of nodes that use a common name-resolution scheme. For example, NRG 102 includes a server node 108, and uses a server-based name-resolution scheme (such as DNS). NRG 104 includes a number of nodes, such as a laptop computer 110 and a smartphone 112. All nodes within NRG 104 rely on a request-flooding name-resolution scheme, such as mDNS. NRG 106 includes a number of nodes, such as a laptop computer 114, a smartphone 116, and a printer 118. All nodes within NRG 106 use DHT for name resolution.

In a FERN system, NRGs are also organized into a naming hierarchy, and a child NRG is a member of its parent. In the example shown in FIG. 1, NRG 102 is the parent of NRGs 104 and 106, and NRG 104 and 106 are members of NRG 102. In some embodiments, this child-parent relationship can be denoted using the same dot-notation as in the DNS. For example, an NRG with the name "abc.parc.usa" is a member of the NRG "parc.usa," which is itself a member of "usa." This child-parent relationship between NRGs creates a name resolution tree (NRT) as in the DNS, with the root NRG "/" at the top, and this tree powers the forwarding of requests among NRGs. More specifically, the request forwarding is first up to the root of the tree and then down to the specific branch. For example, when a member of an NRG tries to resolve a name, it first attempts to resolve the name within the same NRG, and only forwards the request up to its parent when the name cannot be resolved locally. When the request reaches the root of the NRT, it will be forwarded down to the corresponding node.

In the example shown in FIG. 1, when smartphone 112 tries to resolve the address of printer 118, smartphone 112 floods the name-resolution request through NRG 104. Once the request reaches laptop 110, which is capable of communicating with the parent NRG of NRG 104 (i.e., NRG 102), it is forwarded to NRG 102. NRG 102 then tries to resolve the name within itself and its members, including child NRGs 104 and 106. As a result, the request is forwarded down to NRG 106, which uses its DHT to resolve the address of printer 118. The forwarding sequence of this name-resolution request is shown by the circled numbers in FIG. 1. Note that the request forwarding in the FERN system is different from the DNS where a name request is sent directly to a root DNS server which locates the server authoritative for the TLD.

Figure 2:
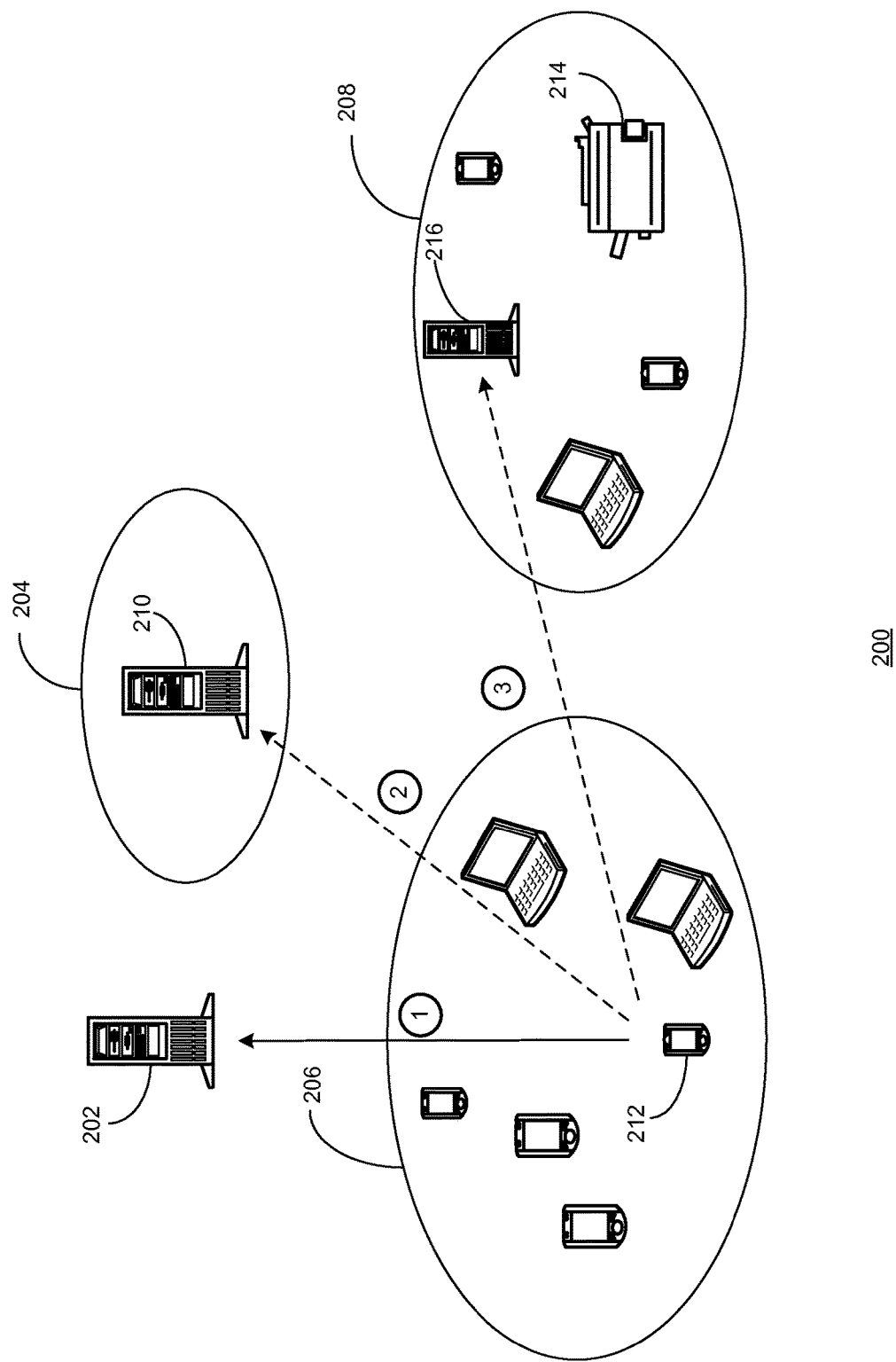
FIG. 2 presents a diagram illustrating an exemplary computer system using DNS and the request-forwarding sequence for the DNS system.

FIG. 2 presents a diagram illustrating an exemplary computer system using DNS and the request-forwarding sequence for the DNS system. In FIG. 2, a computer system 200 includes a root server 202 and a number of name groups (subnets), including name groups 204, 206, and 208. Name group 204 is the top-level domain of name groups 206 and 208. Each name group includes a number of nodes. For example, name group 204 includes a name server 210, name group 206 includes a smartphone 212, and name group 208 includes a printer 214 and a name server 216. All nodes in computer system 200 use DNS. In the example shown in FIG. 2, when smartphone 212 tries to resolve the address of printer 214, it sends a request to root DNS server 202, which returns the address of the TLD server (i.e., name server 210). Smartphone 212 then sends the name request to name server 210, which returns the address of the name server in name group 208. Subsequently, smartphone 212 sends the request to name server 216 to resolve the address of printer 214. The forwarding sequence of the DNS name-resolution request is shown by the circled numbers in FIG. 2. From FIG. 2, one can see that DNS requires that each name group be supported by an authoritative name server (e.g., name server 216 for name group 208). In addition, in DNS, name resolution starts at the root server and descends the NRT, and the name servers support iterative resolution, where the resolver communicates with each name server in turn, as shown by the number sequence.

Similar to DNS, the NRGs in a FERN system are responsible for names that end in the NRG's fully qualified name. For example, an NRG named "abc" (which is the shorthand for "abc.parc.usa") is responsible for queries ending with "abc," such as "printer.abc." Every node in the NRG must be able to resolve names for which the group is responsible. To facilitate these responsibilities, NRGs must provide a way for their members to: (1) register names, (2) resolve names, (3) join the NRG, and (4) leave the NRG. Unlike DNS, an NRG in a FERN system must forward queries for which it is not responsible. As previously explained, the FERN system organizes the NRGs into a naming hierarchy and allows NRGs themselves to be members of their parent NRG.

FIG. 3A presents a table showing the pseudocode API for the FERN name-resolution group, in accordance with an embodiment of the present invention. FIG. 3B presents a table listing a set of rules that govern the behavior of NRGs in a FERN system, in accordance with an embodiment of the present invention. From FIG. 3B, one can see that a node in a particular NRG can forward a name-resolution request that the NRG is not responsible for without knowing the network address of the name being requested. To do so, each NRG only needs to know how to contact its child NRGs and parent NRG. Note that in FIG. 3A, the port (UDP 53) has been chosen for the sake of interoperability with DNS. In addition, the FERN system may also use a traditional DNS record format (such as A, CNAME, etc.). This choice means that to support request forwarding along a branch in the NRT, all an NRG has to store is the network address of the other NRG. This results in an exceedingly simple interstitial function, and means that intergroup resolution through the entire hierarchy can be supported by simple recursion.

In a FERN system, each NRG is free to set its own internal policies. There are no constraints on the number of services or names an individual node may register, the nature of these services, or the number of NRGs of which a node may be a member simultaneously. It is left to individual NRGs to implement and enforce rules such as restricting group membership to certain nodes or restricting the names that a particular node may register. NRGs may choose to adopt and enforce certain naming conventions (similar to the mDNS service registry), and these conventions may even be standardized across different NRGs.

FERN treats group security the same way. NRGs in a FERN system may choose to use encryption, MAC addresses, or other out-of-bound information to authenticate, authorize, and verify their members and names. They may also decide to use name resolution to enforce other security policies, such as only allowing certain nodes to resolve the address of certain services. However, the administration and implementation of these policies are left to the individual NRG, not the entire framework.

For a node to join an NRG with the joinGroup(args) operation in the table shown in FIG. 3A, it must already know the group architecture, any args the group requires, and to whom to send this information. Though the mechanics and specifics of joining an NRG should be handled by the NRG itself, the process of group discovery and acquiring the information listed above can be standardized, because it is a process that exists outside of any individual NRG and may interact with other protocols and systems. There are several protocols (e.g., DHCP and AutoIP) used to help nodes join a network by supporting discovery, authentication, and address acquisition. They also bootstrap DNS resolution by providing hosts with the address of a local DNS server to be used. In some embodiments, the FERN system extends these existing protocols by defining an extra FERN record to be passed to a node when it joins the network. This record contains the full name of the NRG, the structure of the NRG, any group-specific arguments, and a fallback network address to be used as a local DNS server if the node does not recognize the value in the structure of the NRG or is FERN-unaware.

Figure 4:
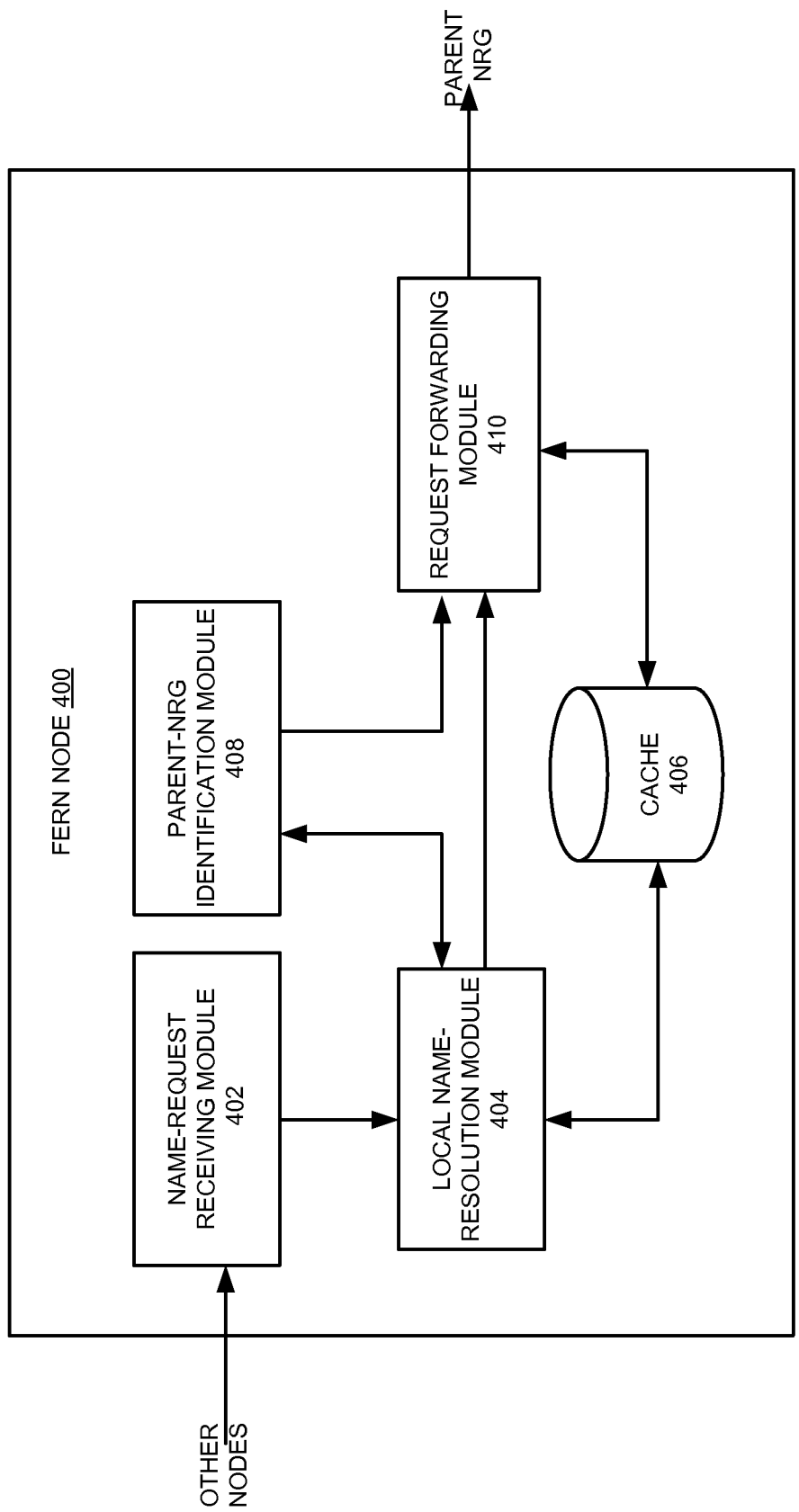
FIG. 4 presents a diagram illustrating the architecture of an exemplary node in a FERN NRG, in accordance with an embodiment of the present invention.

FIG. 4 presents a diagram illustrating the architecture of an exemplary node in a FERN NRG, in accordance with an embodiment of the present invention. In FIG. 4, FERN node 400 includes a name-request receiving module 402, a local name-resolution module 404, a cache 406, a parent-NRG identification module 408, and a request forwarding module 410.

During operation, name-request receiving module 402 is responsible for receiving name-resolution requests or queries from other nodes, which may be a node in the same NRG as node 400 or a node from a different NRG. Note that depending on the name-resolution scheme used within the NRG where node 400 resides, the name-resolution request may have different formats. Also note that in the example shown in FIG. 4, it is assumed that node 400 is the node that receives the name-resolution request. For a DNS-based NRG, node 400 can be the authoritative name server for the NRG.

Local name-resolution module 404 is responsible for resolving the name request locally within the boundary of the NRG. Depending on the name-resolution scheme used within the NRG where node 400 resides, local name-resolution module 404 uses a corresponding name-resolution scheme to attempt to resolve the name request. If the local name resolution fails, parent-NRG identification module 408 is responsible for identifying the parent NRG and resolving the address of the parent. Request forwarding module 410 is responsible for forwarding the name request to the parent NRG. Once the name is resolved and sent back to node 400, cache 406 caches the resolved network address of the requested name and/or network addresses of any intermediate nodes. The cached entry can be used for any future name requests.

Caching name responses and intermediate name referrals significantly reduces latency and overall network load. It changes the system performance and may even result in different behavior. In the DNS, caching benefits stem primarily from reducing the number of round-trips a query takes. In a FERN system, benefits of caching come from "short-circuiting" the group hierarchy. For instance, in the example shown in FIG. 1, if NRG 104 has a cached network address for NRG 106, it may skip the operation of contacting NRG 102 entirely. Caching in FERN is enabled by allowing a group to append an A record (e.g., a 32-bit IPv4 address) for itself when it answers a query or recursively returns the answer to a query. Hence, if a request originates at group A and traverses groups B, C, and D before finishing at E, the requesting node could end up caching the network addresses of groups B through E if these groups elect to append their network addresses to the response. Additionally, intermediate groups may also read these records, so in this example group C could also learn the network addresses of groups D and E.

Caching in the FERN system leads to behavior that closely resembles a hybrid system. In the above example, the bottom groups use architectures better suited for dynamic networks. The first time a node in one of these groups attempts to resolve a name outside of its group, it must first call getParent (a function listed in the table shown in FIG. 3A) and use the group to resolve the address of its parent. However, the resolving node may then cache this address and send all future requests directly to its parent group without needing to re-resolve its address. This behavior is similar to the hybrid approaches, where local requests stay local and system-wide requests are forwarded to the appropriate SBN or DA. Compared with these aforementioned hybrid approaches, the FERN system enables this behavior without the added protocol complexity of specifying how it should be done, figuring out what constitutes a local request, or forcing that system on all network scenarios. This behavior can also be compared to currently available name-resolution systems, where requests are either multicast over mDNS or sent to a local DNS server based on the TLD of the name request. FERN exhibits very similar behavior, yet accomplishes this without fragmenting the namespace.

Figures 5, 6:
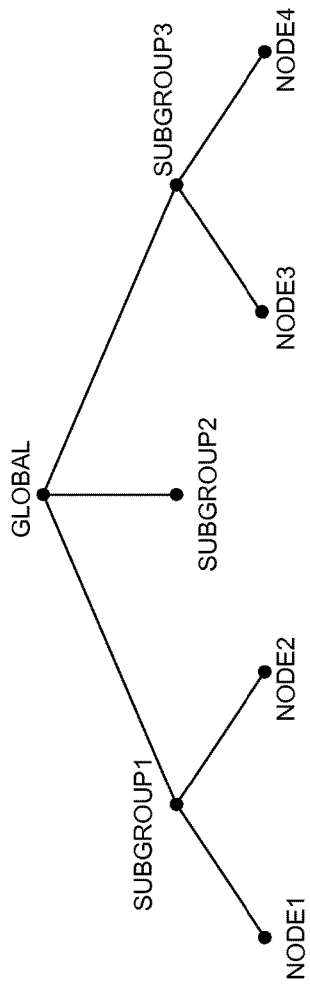
FIG. 5 presents a diagram illustrating a set of caching rules, in accordance with an embodiment of the present invention.
FIG. 6 presents a diagram illustrating an exemplary name resolution tree (NRT).

The caching in FERN is similar to yet different from the caching in the DNS. In the DNS, caching can only occur down the tree, and caching improves performance by reducing the load on top-level name servers and the number of referrals. However, in FERN, caching can also occur up the tree. While this is a feature aimed at improving performance, it could make FERN perform much like DNS if nodes were to use the address of the NRT root to resolve names. For example, consider the case where a node "node1.subgroup1.example.usa" needs to resolve the name "node2.subgroup2.example2.uk," and caching is enabled for any NRG in the FERN NRT. Since the root of the NRT is the closest common ancestor between the node and the name that must be resolved, the node caches the network address of the NRT root once resolution is complete. After that, anytime the same node needs to resolve a name outside of the "usa" name group, the closest-matching group will always be the NRT root, and the node will contact the root directly. To eliminate this problem, in some embodiments, the FERN system enforces a set of caching rules. FIG. 5 presents a diagram illustrating a set of caching rules, in accordance with an embodiment of the present invention.

The FERN caching rules shown in FIG. 5 significantly reduce the load on nodes in NRGs that are higher in the hierarchy and serve to create a much more distributed system. To revisit the previous example, once "node1.subgroup1.example.usa" resolves the address of "node2.subgroup2.example2.uk," the name group "uk" is cached only by two groups: the "root" and "usa." Not only does this help to reduce traffic on the top name servers, it also helps provide cached information to other nodes. Now, if the same node wishes to resolve a name in the TLD "china," rather than query the root directly (and get a direct response), it must go up the tree through the name group "usa." This behavior ensures that now "usa" is on the return-path and has the opportunity to cache the network address for "china," which further reduces traffic on the root group, since all subsequent requests from nodes in name group "usa" for nodes in name group "china" would be able to take advantage of the cache-hit in "usa." Together, the FERN rules in FIG. 3B and FIG. 5 provide interoperability across different architectures while limiting the amount of information that any one NRG must maintain.

The FERN process of forwarding requests up and then down the NRT also affects the fault tolerance and resilience of the system. In DNS, if a node is unable to contact the root server, it is unable to perform any name resolution, as shown in FIG. 2. This behavior makes the root server an attractive target for attackers, and also restricts the usefulness of DNS to nodes that can access a root name server, as opposed to nodes in a private network or MANET. In contrast, FERN requests only travel up the NRT as far as necessary.

FIG. 6 presents a diagram illustrating an exemplary name resolution tree (NRT). In FIG. 6, NRT 600 includes a root node (the "global" node) and three branches below the root node. The branch on the left-hand side includes a parent NRG, "subgroup1," and two child NRGs, "node1" and "node2." The branch on the right-hand side includes a parent NRG, "subgroup3," and two child NRGs, "node3" and "node4." In the example shown in FIG. 6, based on the FERN NRG rules and caching rules (see FIG. 3B and FIG. 5), the only queries that would reach the root NRG are requests from NRG "subgroup1" to NRG "subgroup3" or vice-versa. All other traffic stays within either NRG, and thus would function normally independently of the ability of either NRG to access the root NRG.

By forwarding queries in the manner described above, FERN reduces reliance on the top-level NRGs of the NRT and improves resilience among lower level NRGs. If a root or TLD server fails, or if an NRG is cut off from these servers due to a network partition, internal resolution is unaffected. As a result, name resolution in FERN is much more distributed. Ideally, if an active route exists between two hosts, they should be able to resolve each other's names and communicate. Conversely, if no route exists between the hosts, then name resolution is unimportant because even in the event of successful resolution, no communication can occur.

The FERN architecture ensures that some local FERN request can still be resolved even in the presence of intermediate failure points. Now consider the example shown in FIG. 6 when the NRG "subgroup3" fails. In DNS, all nodes (including nodes within the domain "subgroup3") would be unable to resolve any names below domain "subgroup3" in the tree, but are able to resolve all other names. In contrast, in FERN, requests that stay inside NRGs "node3" or "node4" would still succeed, but none of the nodes in these NRGs would be able to resolve any names outside of "subgroup3," unless the NRT is modified to reflect the failure that took place.

FERN addresses this problem by allowing nodes to cache the network address of other nodes in their ancestor NRGs all the way up to the root of the NRT. Note that, in accordance with the FERN caching rules shown in FIG. 5, these network addresses cannot be used for the forwarding of requests. The addresses are used solely for fault tolerance. An NRG may use these addresses to forward requests to its grandparent if and only if its parent is unresponsive. With this rule in place, FERN may often do better than DNS (by preserving internal resolution when possible) but it never does worse, since it effectively reduces to DNS when intermediate NRGs fail.

To reduce the risk of node failure, NRGs may also choose to replicate records across K>1 separate nodes. Choosing a proper value for K depends heavily on the underlying network. In the Internet case, the DNS itself shows that small values of K are sufficient. For example, over 80% of DNS entries can be supported by just one or two name servers. In other network scenarios, such as MANETs, K=1 might be completely acceptable if the only node bridging name requests is also the only node able to perform network address translation (in which case its failure also partitions the network). Ideally, K should be sufficiently large so that name resolution reflects network connectivity.

The FERN NRG rules and caching rules shown in FIG. 3B and FIG. 5 can be used to formally prove that requests processed in FERN deterministically terminate, do not loop, and are resolved correctly.

Deployment Consideration

As discussed previously, in a FERN system, internal group resolution can take many forms, including but not limited to: DNS, mDNS, SSDP, SLP, DHT, MDHT, etc. As a result, FERN can be used to bridge all existing name-resolution protocols today without the need to modify them. Supporting mDNS is trivial, and can be accomplished by simply appending ".local" to the end of a name request before sending it to an mDNS daemon. DNS integration is equally straightforward, though it comes with one caveat: given that the resolution of DNS queries starts at the root, if the DNS is used to power a FERN NRG, the NRG must be the highest group in the FERN NRT; otherwise, unnecessary request-forwarding and group traversal can occur. However, because the DNS is already well established, we believe that FERN NRGs could exist "underneath" the current DNS hierarchy, using the DNS for Internet resolution, while still supporting other networks where the DNS is not appropriate.

Another factor that may affect the system performance is the internal communication within an NRG. The best choice for internal group communication depends on both the underlying network topology and the number of nodes in the NRG. Though an NRG may specify that only a certain number of nodes may join, the number of nodes in an NRG is determined primarily by external factors, which in turn determine group communication. These external factors could be logical (the number of people in an organization), hierarchical (an organization chart), or based on the underlying network topology (e.g., nodes in a MANET).

In the case of the Internet, a connected underlying network with static addresses, the client-server architecture has been shown by the DNS to be efficient and scalable, and provides an attractive first choice. For fully connected networks with dynamic network addresses (such as an internal subnet or home network), a DHT may be a better choice for both robustness and dynamic updating.

In addition, the height of the NRT may also affect the performance of a FERN system. The current DNS hierarchy is relatively shallow, with a typical height of three or four levels, but is almost exclusively limited to naming Internet servers. A full FERN NRT would be allowed to have more levels, because part of the intent of FERN is to expand name resolution to devices in different network environments. As described above, the addition of NRGs in the NRT could be the result of several logical or organizational factors, as well as underlying network concerns (such as bridging resolution across two MANETs). It can be shown that the latency overhead of adding another logical group to the hierarchy is minimal because FERN minimizes inter-group latency by requiring groups to resolve name requests recursively and organizing nodes in a hierarchy that reflects physical proximity (i.e., assigning countries or physical regions to TLDs). Note that this ensures that requests only traverse a particular long-haul link (i.e., the Pacific Ocean) once.

Figure 7:
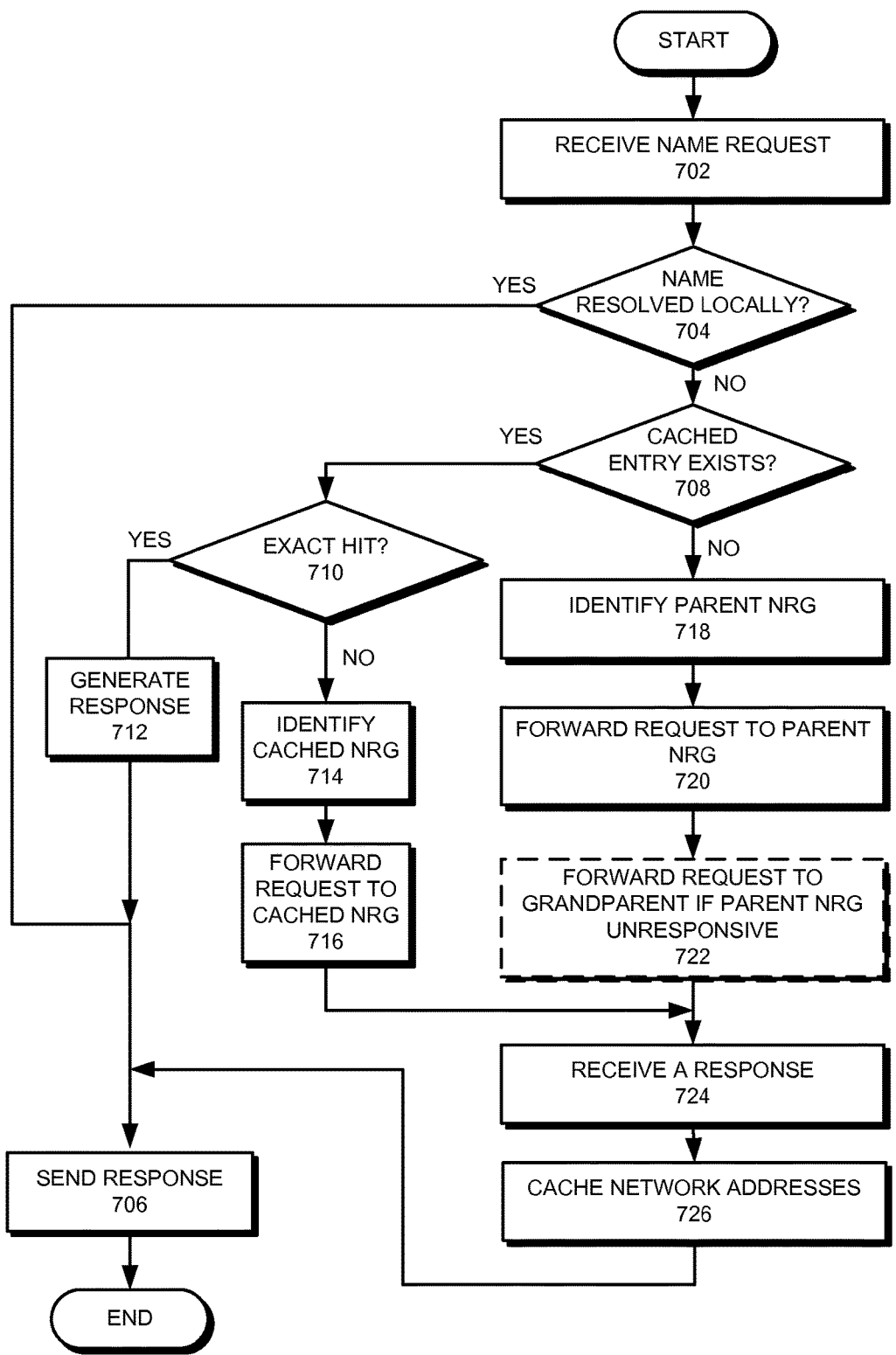
FIG. 7 presents a flowchart illustrating an exemplary name-resolution process, in accordance with an embodiment of the present invention.

FIG. 7 presents a flowchart illustrating an exemplary name-resolution process, in accordance with an embodiment of the present invention. During operation, an NRG in the FERN system receives a name request (operation 702). Note that depending on the type of NRG, the name request may be in a different format and may be sent to a name server or every node within the NRG. The NRG then attempts to resolve the name request locally (operation 704). If the name is resolved locally, a response is sent back to the originating node (operation 706). Otherwise, a cache is checked to determine whether one or more cached entries that are associated with the name exist (operation 708). If so, the system determines whether the cached entry is an exact hit (i.e., the cached network address is the requested address) (operation 710). If so, a response is generated based on the exact cache hit (operation 712). If not, the system performs a longest-prefix-matching among the cached entries to identify the network address of the NRG or the parent NRG to which the name belongs (operation 714), and forwards the name request to the identified NRG or the identified parent NRG (operation 716).

In response to not finding a cached entry for the address, the NRG identifies its own parent NRG (operation 718). In some embodiments, the parent NRG can be identified by calling the getParent( ) function as shown in FIG. 3A. Note that in some cases, the address of the parent NRG may exist in the cache. Once the parent NRG is identified, the name request is forwarded to the parent NRG (operation 720). For fault tolerance purposes, if the parent NRG is unresponsive, the NRG may optionally forward the name request to its grandparent NRG (operation 722). In one embodiment, the NRG will forward the name request to its grandparent NRG if no response is received from its parent NRG after a predetermined waiting period. This process can be iterative until the root NRG is reached. Note that, if the forwarding of the name request fails (e.g., the NRG failed to identify its parent), the NRG will respond to the requesting node with an error message.

Subsequently, the NRG receives a response to the name request (operation 724), caches the network address of the name, and/or network address of any intermediate nodes (operation 726), and sends the response to the originating node (operation 706).

In general, FERN provides a robust framework for name resolution and service discovery. It provides one global namespace and supports both global and local name resolution, yet does so without the previous constraints on both namespaces. By supporting different name-resolution architectures, FERN paves the way for optimization of name-resolution protocols for their corresponding networks and serves as an important stepping-stone for interoperability between heterogeneous networks, such as wireless sensor networks and MANETs, home "Internet-of-Things" networks, and the general Internet.

Computer System

Figure 8:
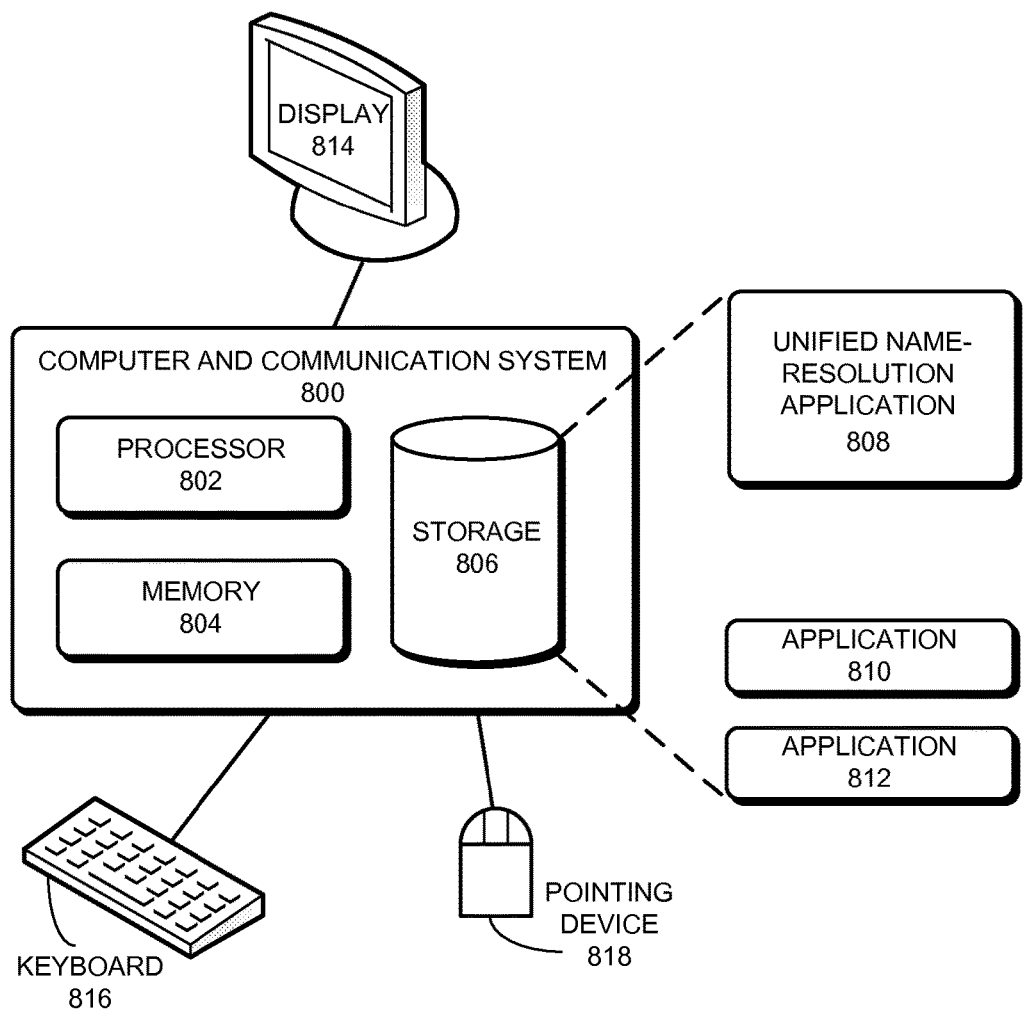
FIG. 8 illustrates an exemplary computer system for unifying name resolution, in accordance with one embodiment of the present invention.

FIG. 8 illustrates an exemplary computer system for unifying name resolution, in accordance with one embodiment of the present invention. In one embodiment, a computer and communication system 800 includes a processor 802, a memory 804, and a storage device 806. Storage device 806 stores a unified name-resolution application 808, as well as other applications, such as applications 810 and 812. During operation, unified name-resolution application 808 is loaded from storage device 806 into memory 804 and then executed by processor 802. While executing the program, processor 802 performs the aforementioned functions. Computer and communication system 800 is coupled to an optional display 814, keyboard 816, and pointing device 818.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for resolving a name request in a network, comprising:
   receiving the name request by a network node of a first group of network nodes that are operating under a first name resolution scheme, wherein the name request is for a node of a second group;
   identifying, by the network node of the first group, a parent group of the first group in a hierarchy of name resolution groups, wherein the first group is lower in the hierarchy than the parent group, and the parent group operates under a name resolution scheme that is different from the first name resolution scheme;
   in response to failing to resolve the name request within the first group using the first name resolution scheme, forwarding the name request to the identified parent group;
   receiving, by the network node through the parent group, a first response to the name request, wherein the parent group is higher in the hierarchy than both the first group and the second group, and the first response indicates a network address of a requested name of the name request and a network address of an intermediate node;
   caching the network address of the requested name;
   determining, based on the hierarchy of name resolution groups, whether a hierarchy level of the intermediate node is equal to or below the first group;
   in response to the hierarchy level of the intermediate node being equal to or below the first group, caching the network address of the intermediate node, wherein a name request to a node can be sent immediately to the cached network address of the intermediate node bypassing the parent group; and sending a second response to the name request based on the first response.

2. The method of claim 1, further comprising:

in response to the parent group not responding to the name request, forwarding the name request to a grandparent group of the first group.

3. The method of claim 1, further comprising:

determining that a cached entry associated with the name request exists; and forwarding the name request or generating a response based on the cached entry.

4. The method of claim 1, wherein the hierarchy of name resolution groups uses a plurality of name-resolution approaches, including one or more of:

Domain Name System (DNS);

multicast DNS (mDNS); and distributed hash table (DHT) based name-resolution scheme.

5. The method of claim 1, further comprising:

responding with an error message to the name request in response to failing to forward the name request.

6. A non-transitory computer-readable storage medium storing instructions that, when executed by a computer, cause the computer to perform a method for resolving a name request in a network, the method comprising:

receiving the name request by a network node of a first group of network nodes that are operating under a first name resolution scheme, wherein the name request is for a node of a second group;

identifying, by the network node of the first group, a parent group of the first group in a hierarchy of name resolution groups, wherein the first group is lower in the hierarchy than the parent group, and the parent group operates under a name resolution scheme that is different from the first name resolution scheme;

in response to failing to resolve the name request within the first group using the first name resolution scheme, forwarding the name request to the identified parent group;

receiving, through the parent group, a first response to the name request, wherein the parent group is higher in the hierarchy than both the first group and the second group, and the first response indicates a network address of a requested name of the name request and a network address of an intermediate node;

caching the network address of the requested name;

determining, based on the hierarchy of name resolution groups, whether a hierarchy level of the intermediate node is equal to or below the first group;

in response to the hierarchy level of the intermediate node being equal to or below the first group, caching the network address of the intermediate node, wherein a name request to a node can be sent immediately to the cached network address of the intermediate node bypassing the parent group; and sending a second response to the name request based on the first response.

7. The computer-readable storage medium of claim 6, wherein the method further comprises:

in response to the parent group not responding to the name request, forwarding the name request to a grandparent group of the group.

8. The computer-readable storage medium of claim 6, wherein the method further comprises:

determining that a cached entry associated with the name request exists; and forwarding the name request or generating a response based on the cached entry.

9. The computer-readable storage medium of claim 6, wherein the hierarchy of name resolution groups uses a plurality of name-resolution approaches, including one or more of:

Domain Name System (DNS);

multicast DNS (mDNS); and distributed hash table (DHT) based name-resolution scheme.

10. The computer-readable storage medium of claim 6, wherein the method further comprises:

responding with an error message to the name request in response to failing to forward the name request.

11. A system comprising:

a plurality of groups of network nodes that operate under different name-resolution schemes, wherein a node of a first group of the plurality of groups of network nodes is a computing device with one or more processors and a memory and is configured for receiving a name request, for a node of a second group of the plurality of groups of network nodes, and the node is configured to:

identify, by the one or more processors, a parent group of the first group in a hierarchy of name resolution groups, wherein the first group is lower in the hierarchy than the parent group, and the parent group operates under a name resolution scheme that is different from a first name resolution scheme of the first group;

in response to failing to resolve the name request within the first group using the first name resolution scheme, forward the name request to the identified parent group;

receive, through the parent group, a first response to the name request, wherein the parent group is higher in the hierarchy than both the first group and the second group, and the first response indicates a network address of a requested name of the name request and a network address of an intermediate node;

cache the network address of the requested name;

determine, based on the hierarchy of name resolution groups, whether a hierarchy level of the intermediate node is equal to or below the first group;

in response to the hierarchy level of the intermediate node being equal to or below the first group, cache the network address of the intermediate node, wherein a name request to a node can be sent immediately to the cached network address of the intermediate node bypassing the parent group; and send a second response to the name request based on the first response.

12. The system of claim 11, wherein the node is further configured to, in response to the parent group not responding to the name request, forward the name request to a grandparent group of the first group.

13. The system of claim 11, wherein the node is further configured to:

determine that a cached entry associated with the name request exists; and forward the name request or generate a response based on the cached entry.

14. The system of claim 11, wherein the hierarchy of name resolution groups uses a plurality of name-resolution approaches, including one or more of:

Domain Name System (DNS);

multicast DNS (mDNS); and distributed hash table (DHT) based name-resolution scheme.

15. The system of claim 11, wherein the node is further configured to respond with an error message to the name request in response to failing to forward the name request.

* * * * *